(12) United States Patent
Park et al.

(10) Patent No.: US 10,593,957 B2
(45) Date of Patent: Mar. 17, 2020

(54) GAS DIFFUSION LAYER FOR FUEL CELLS AND METHOD OF MANUFACTURING THE SAME

(71) Applicants: Hyundai Motor Company, Seoul (KR); Kia Motors Corporation, Seoul (KR)

(72) Inventors: Jae Man Park, Incheon (KR); Kook Il Han, Seongnam-si (KR); Ji Han Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 15/664,378

(22) Filed: Jul. 31, 2017

(65) Prior Publication Data
US 2018/0175393 A1    Jun. 21, 2018

(30) Foreign Application Priority Data
Dec. 16, 2016    (KR) .................. 10-2016-0172460

(51) Int. Cl.
*H01M 4/88* (2006.01)
*H01M 8/1004* (2016.01)
(Continued)

(52) U.S. Cl.
CPC ....... *H01M 4/8807* (2013.01); *H01M 4/8605* (2013.01); *H01M 4/8817* (2013.01); *H01M 8/0234* (2013.01); *H01M 8/0245* (2013.01); *H01M 8/1004* (2013.01); *H01M 2008/1095* (2013.01); *H01M 2250/20* (2013.01); *Y02P 70/56* (2015.11)

(58) Field of Classification Search
CPC ..... H01M 2008/1095; H01M 2250/20; H01M 4/8605; H01M 4/8807; H01M 4/8817; H01M 8/0234; H01M 8/0245; H01M 8/1004
See application file for complete search history.

(56) References Cited

U.S. PATENT DOCUMENTS

2004/0009387 A1* 1/2004 Aoki .................. H01M 8/1004
429/413
2004/0086775 A1* 5/2004 Lloyd .................. H01M 4/861
429/413
(Continued)

FOREIGN PATENT DOCUMENTS

| KR | 101349075 B1 | 1/2014 |
|---|---|---|
| KR | 20140003894 A | 1/2014 |
| KR | 101484762 B1 | 1/2015 |

*Primary Examiner* — Adam A Arciero
(74) *Attorney, Agent, or Firm* — Slater Matsil, LLP

(57) ABSTRACT

In one embodiment, a gas diffusion layer for fuel cells includes a fine porous layer formed on a carbon fiber support and being interposed between a membrane-electrode assembly (MEA) and a separator. The carbon fiber support includes a fine pore area having a predetermined average pore size in a separator direction (thickness direction) in the membrane electrode assembly, and a coarse pore area having a larger predetermined average pore size than the average pore size of the fine pore area in the separator direction (thickness direction) in the membrane electrode assembly. The fine pore area and the coarse pore area are alternately formed.

18 Claims, 5 Drawing Sheets

(51) Int. Cl.
*H01M 4/86* (2006.01)
*H01M 8/0245* (2016.01)
*H01M 8/0234* (2016.01)
*H01M 8/1018* (2016.01)

(56) References Cited

U.S. PATENT DOCUMENTS

| | | |
|---|---|---|
| 2013/0089807 A1 | 4/2013 | Hong et al. |
| 2014/0272659 A1* | 9/2014 | Lu .................... H01M 8/04291 |
| | | 429/450 |
| 2014/0272664 A1* | 9/2014 | Lu ....................... H01M 4/8626 |
| | | 429/482 |

* cited by examiner

GAS DIFFUSION LAYER FOR FUEL CELLS AND METHOD OF MANUFACTURING THE SAME

CROSS-REFERENCE TO RELATED APPLICATIONS

This application claims the priority benefit of Korean Patent Application No. 10-2016-0172460, filed on Dec. 16, 2016 in the Korean Intellectual Property Office, the disclosure of which is incorporated herein by reference.

TECHNICAL FIELD

The present invention relates to a gas diffusion layer for fuel cells and a method of manufacturing the same.

BACKGROUND

A fuel cell is an electricity generator which converts chemical energy of a fuel into electric energy by electrochemical reaction in a stack, which can be used to supply power for industrial, domestic and vehicle applications, as well as for small electronic equipment such as portable devices. Recently, the application field of fuel cells as highly efficient clean energy sources gradually extends.

FIG. 1 shows a unit cell of a general fuel cell.

As can be seen from FIG. 1, the unit cell of the general fuel cell includes a membrane electrode assembly (MEA, 10) in the innermost part thereof, and the membrane electrode assembly 10 includes a polymer electrolyte membrane 11 to allow protons to flow, and catalyst layers, that is, an air electrode (cathode, 12) and a fuel electrode (anode, 13) which are coated on opposite surfaces of the polymer electrolyte membrane 11 to allow hydrogen and oxygen to react.

In addition, the gas diffusion layer (GDL, 20) is stacked on an outer part of the membrane electrode assembly 10, that is, an outer part of the membrane electrode assembly 10 where the air electrode 12 and the fuel electrode 13 are disposed, and a separator 30 provided with a flow field to supply a fuel and discharge water produced by reaction is disposed outside the gas diffusion layer 20.

In this case, the gas diffusion layer 20 is obtained by forming a fine porous layer 22 on one or two surfaces of a carbon fiber support 21 generally including a porous carbon paper.

In addition, the carbon fiber support 21 generally includes carbon fibers and a polytetrafluoroethylene-based hydrophobic substance. For example, the carbon fiber may take the form of carbon fiber cloth, carbon fiber felt or carbon fiber paper.

In addition, the fine porous layer 22 may be formed by preparing a mixture of a carbon powder such as acetylene black carbon or Black Pearls carbon and a hydrophobic agent such as polytetrafluoroethylene (PTFE) and applying the mixture to one or two surfaces of the carbon fiber support 21 depending on desired application.

Meanwhile, oxidization of hydrogen occurs at the fuel electrode 13 to produce a hydrogen ion (proton) and an electron, which move to the air electrode 12 via the electrolyte membrane 11 and a wire, respectively, while electrochemical reaction of the hydrogen ion and electron moved from the fuel electrode 13 with oxygen in the air occurs at the air electrode 12 to produce water and, at the same time, electric energy based on flow of the electron.

The gas-phase reactive gas supplied to the fuel cell and liquid-phase product water produced by chemical reaction are moved via the gas diffusion layer 20 from the membrane electrode assembly 10 and the separator 30.

In this case, the liquid-phase product water is moved through difference in capillary pressure in the gas diffusion layer 20 from the fine pore layer 22 to the carbon fiber support 21. Accordingly, the product water passes through the fine pore layer 22 and then moves in the carbon fiber support 21 via a selective channel having a greater difference in capillary pressure. That is, the product water tends to selectively move only through the channel facilitating movement, rather than through random channels in the gas diffusion layer.

As a result, the product water is concentrated on the selected channel, thus resulting in a problem in which the channel overflows with water and is thus clogged. The surrounding also overflows with water and the pores of the gas diffusion layer 20 are filled with water, disadvantageously blocking transfer of reactive gas and causing deterioration in cell performance (flooding).

SUMMARY

Embodiments of the present invention relate to a gas diffusion layer for fuel cells and a method of manufacturing the same. Particular embodiments relate to a gas diffusion layer for fuel cells including transfer channels allowing a gas and a liquid to selectively flow, and a method of manufacturing the same.

Embodiments of the present invention can solve the problems noted above, for example, by providing a gas diffusion layer for fuel cells including a transfer channel allowing a gas and a liquid to selectively flow to facilitate transfer of reactive gas and product water.

In accordance with the present invention, a gas diffusion layer for fuel cells includes a fine porous layer formed on a carbon fiber support and being interposed between a membrane-electrode assembly (MEA) and a separator. The carbon fiber support includes a fine pore area having a predetermined average pore size in a separator direction (thickness direction) in the membrane electrode assembly, and a coarse pore area having a larger predetermined average pore size than the average pore size of the fine pore area in the separator direction (thickness direction) in the membrane electrode assembly. The fine pore area and the coarse pore area are alternately formed.

The fine pore area and the coarse pore area may be alternately formed, based on a length direction.

The fine pore area and the coarse pore area may be alternately formed based on a width direction.

The average pore size of the fine pore area may be less than 40 μm and the average pore size of the coarse pore area may be greater than 40 μm.

A proportion of the coarse pore area may be greater than a proportion of the fine pore area.

The fine pore area and the coarse pore area may be repeatedly disposed at a ratio of 40 to 50:50 to 60.

In another aspect of the present invention, a method can be used for manufacturing a gas diffusion layer for fuel cells that include a fine porous layer formed on a carbon fiber support and being interposed between a membrane-electrode assembly (MEA) and a separator. The method includes preparing carbon fibers for fine pores to form fine pores, preparing carbon fibers for coarse pores to form coarse pores and alternately dispersing the carbon fibers for fine pores and the carbon fibers for coarse pores on the same plane to form a carbon fiber support.

The preparation of the carbon fibers for fine pores may be carried out using a short fiber type of first carbon fibers, and the preparation of the carbon fibers for coarse pores may be carried out using a long fiber type of second carbon fibers.

The preparation of the carbon fibers for fine pores may be carried out using a combination of a short fiber type of first carbon fibers and a long fiber type of second carbon fibers, and the preparation of the carbon fibers for coarse pores may be carried out using a combination of a short fiber type of first carbon fibers and a long fiber type of second carbon fibers, wherein a proportion of the first carbon fibers mixed for the preparation of the carbon fibers for fine pores is higher than a proportion of the first carbon fibers mixed for the preparation of the carbon fibers for coarse pores.

The formation of the carbon fiber support may be carried out by alternately dispersing the carbon fibers for fine pores and the carbon fibers for coarse pores based on a length direction.

The formation of the carbon fiber support may be carried out by alternately dispersing the carbon fibers for fine pores and the carbon fibers for coarse pores based on a width direction.

The method may further include forming a fine pore layer on at least one surface of the carbon fiber support, after forming the carbon fiber support.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
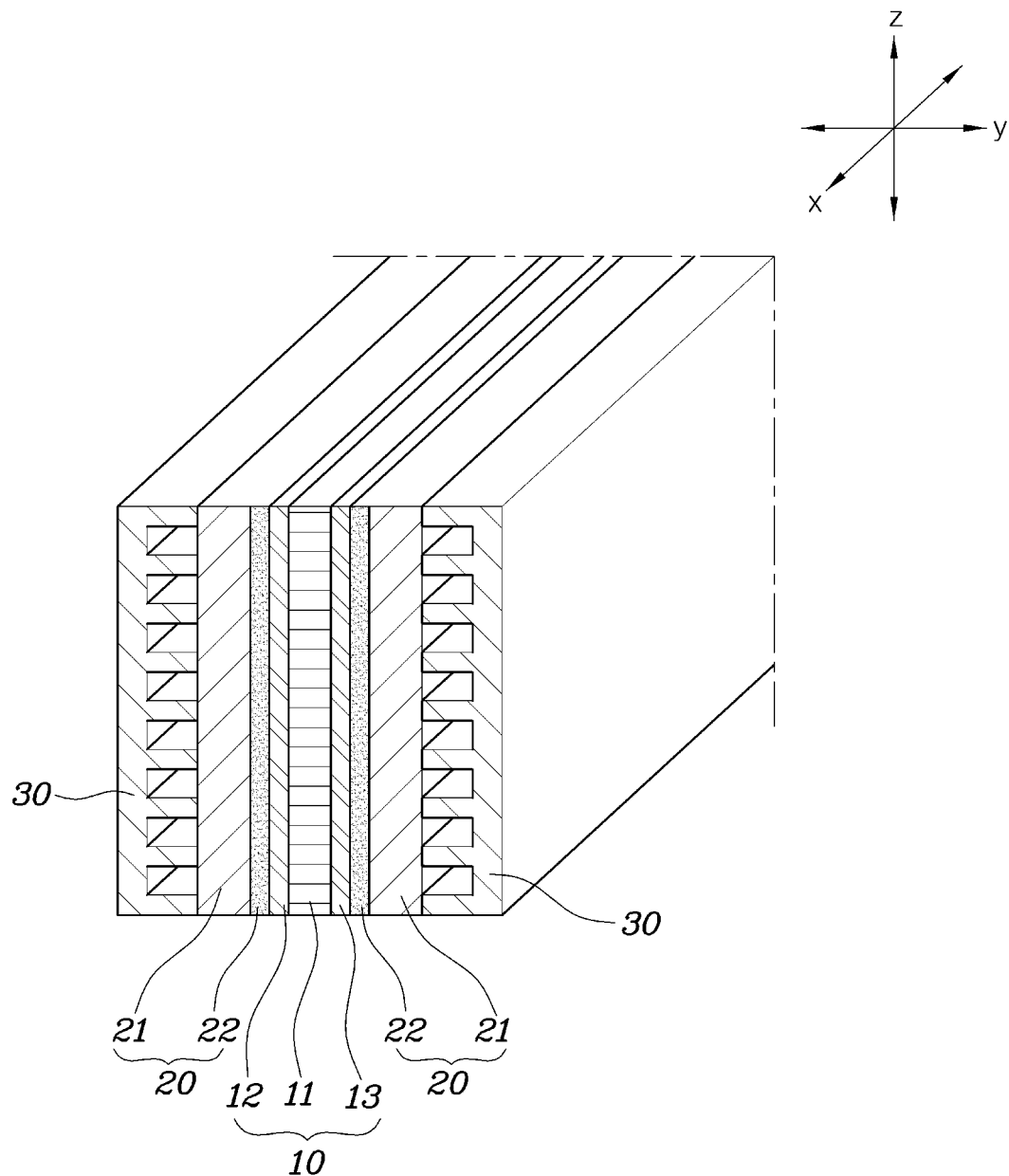
FIG. 1 shows a unit cell of a general fuel cell.

Reference will now be made in detail to the preferred embodiments of the present invention, examples of which are illustrated in the accompanying drawings. However, the present invention is not limited to the embodiments and can be implemented in various forms. The embodiments are provided only to fully illustrate the present invention and to completely inform those having ordinary knowledge in the art of the scope of the present invention. Throughout the drawings, like reference numerals designate like elements.

Figure 2:
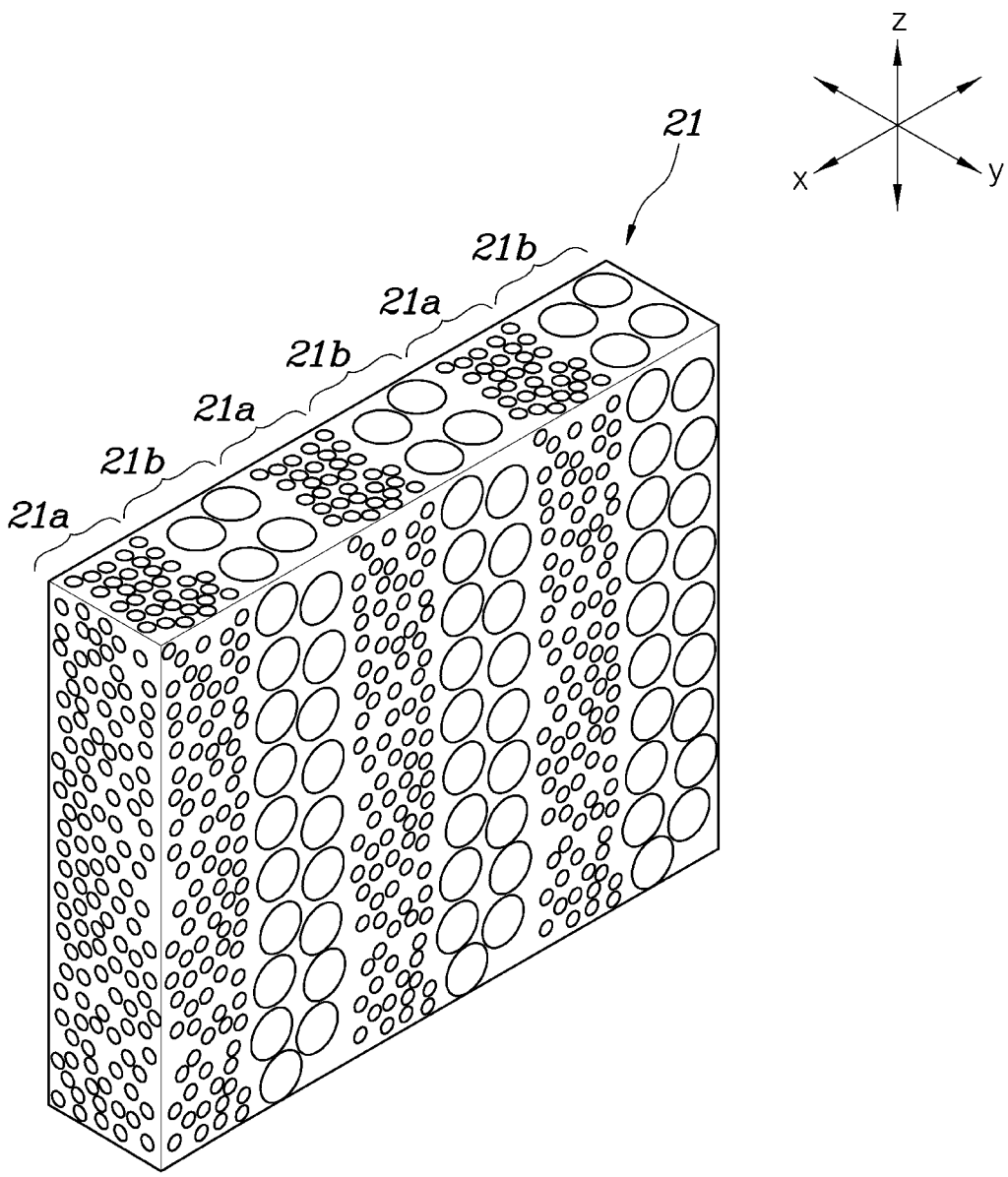
FIG. 2 shows a configuration of a gas diffusion layer for fuel cells according one embodiment of the present invention.
Figure 3:
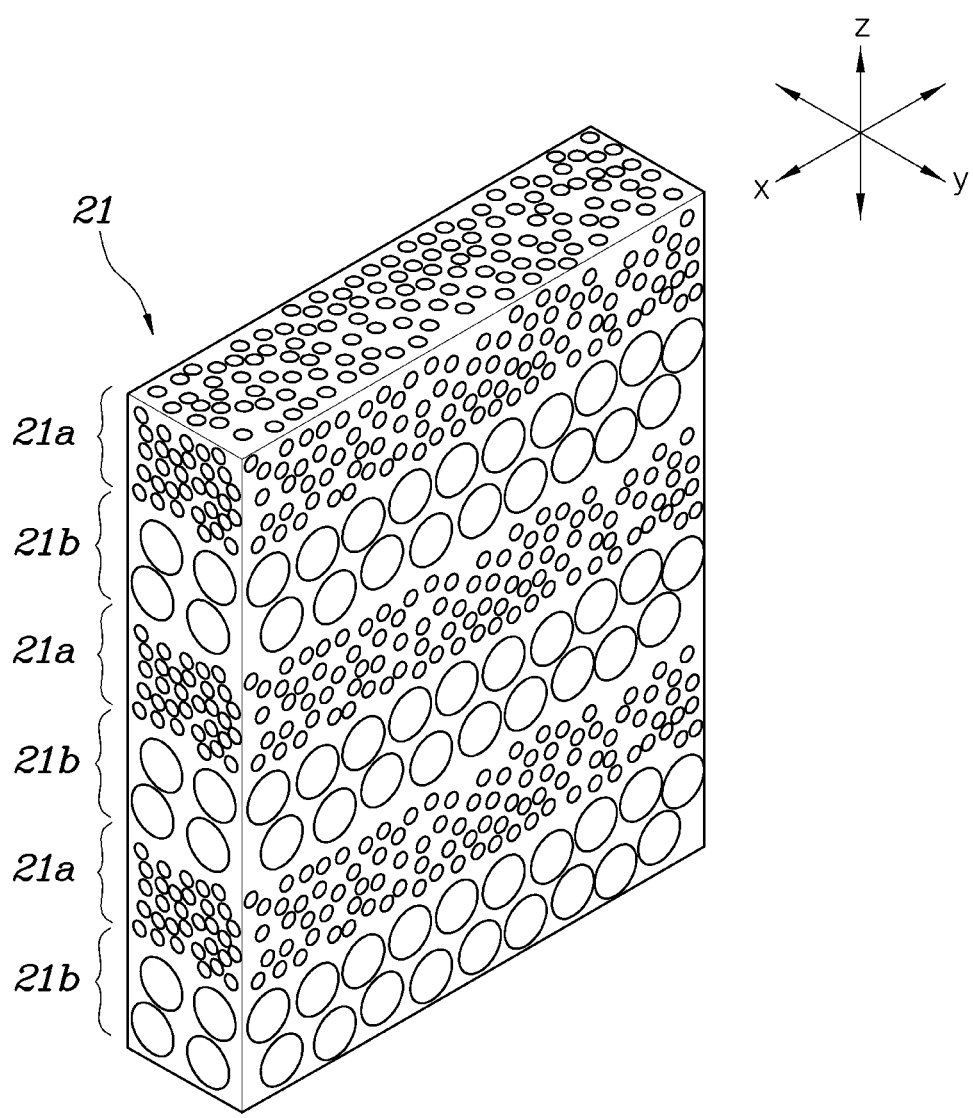
FIG. 3 shows a configuration of a gas diffusion layer for fuel cells according to another embodiment of the present invention.
Figure 4:
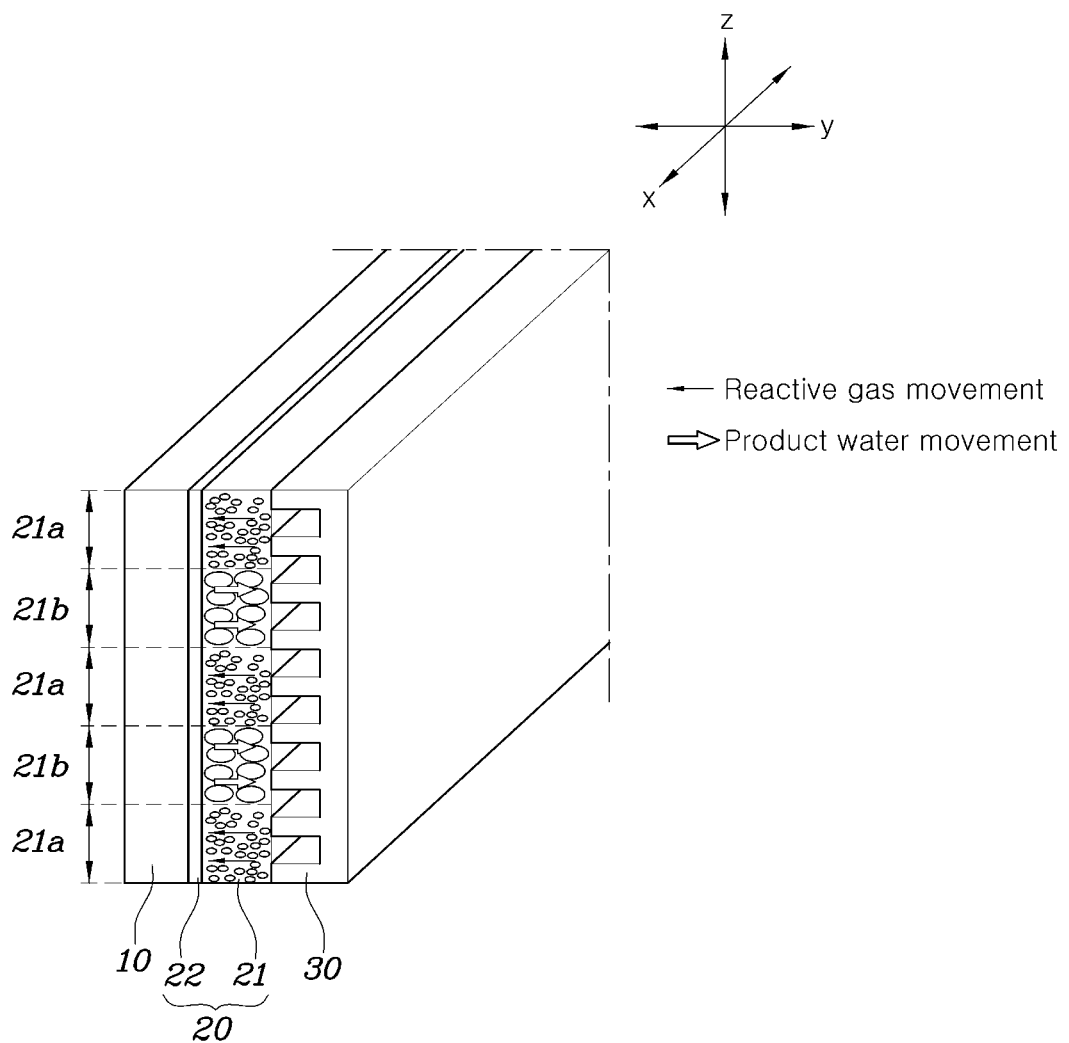
FIG. 4 shows transfer of reactive gas and product water in a fuel cell including the gas diffusion layer for fuel cells according to one embodiment of the present invention.

FIG. 2 shows a configuration of a gas diffusion layer for fuel cells according to one embodiment of the present invention, FIG. 3 shows a configuration of a gas diffusion layer for fuel cells according to another embodiment of the present invention, and FIG. 4 shows transfer of reactive gas and product water in a fuel cell including the gas diffusion layer for fuel cells according to one embodiment of the present invention.

First, for clear description, throughout the drawings, an x-axis direction is defined as a length direction, a y-axis direction is defined as a thickness direction and a z-axis direction is defined as a width direction.

As shown in FIG. 2, the gas diffusion layer for fuel cells 20 according one embodiment of the present invention includes a carbon fiber support 21 made of a porous carbon paper, and a fine porous layer 22 formed on one or two surfaces of the carbon fiber support 21. The main subject matter of the present invention focuses on the carbon fiber support 21.

The carbon fiber support 21 is, for example, made of carbon fiber, while the fine porous layer 22 is, for example, made of a carbon powder. The carbon fiber support 21 and the fine porous layer 22 can be realized using a variety of materials generally for forming the gas diffusion layer.

Meanwhile, the carbon fiber support 21 includes a fine pore area 21a having a predetermined average pore size in a direction of the separator 30 (y-axis direction) in the membrane electrode assembly 10, and a coarse pore area 21b having a predetermined average pore size in the direction of the separator 30 (y-axis direction) in the membrane electrode assembly 10, wherein the average pore size of the coarse pore area 21b is larger than the average pore size of the fine pore area 21a.

The carbon fiber support 21 including the fine pore area 21a and the coarse pore area 21b described above can be formed using carbon fibers. In order to distinguish the fine pore area 21a and the coarse pore area 21b having different average pore sizes from each other, the fine pore area 21a and the coarse pore area 21b are each formed using different lengths of carbon fibers.

For example, the fine pore area 21a is formed by mixing a short fiber type of first carbon fibers so that the fine pore area 21a can have a smaller average pore size than a general average pore size (about 40 μm) to form conventional gas diffusion layers. For this purpose, the first carbon fibers may be carbon fibers having a length of about 6 mm.

In addition, the coarse pore area 21b is formed by mixing a long fiber type of second carbon fibers so that the coarse pore area 21b has a larger average pore size than the average pore size of the fine pore area 21a. Accordingly, the coarse pore area 21b preferably has an average pore size greater than about 40 μm. For this purpose, the second carbon fibers may be carbon fibers having a length of about 12 mm.

Meanwhile, both the fine pore area 21a and the coarse pore area 21b can be formed by mixing a short fiber type of first carbon fibers with a long fiber type of second carbon fibers. In this case, the proportion of the first carbon fibers mixed to form the fine pore area 21a is designed to be higher than the proportion of the first carbon fibers mixed to form the coarse pore area 21b, so that the average pore size of the fine pore area 21a is larger than the average pore size of the coarse pore area 21b.

As a result, in the present embodiment, when the reactive gas and product water move via the carbon fiber support 21 formed on the gas diffusion layer 20 between the membrane electrode assembly 10 and the separator 30, the product water selectively moves to the coarse pore area 21b, while the reactive gas selectively moves to the fine pore area 21a.

In other words, due to low capillary pressure of the coarse pore area 21b having relatively large pores, liquid-phase product water moves to the coarse pore area 21b, while gas-phase reactive gas moves to the fine pore area 21a having relatively small pores. In this case, since both the fine pore area 21*a* and the coarse pore area 21*b* have a predetermined average pore size in a thickness direction (y-axis direction), movement of the product water and reactive gas between the membrane electrode assembly 10 and the separator 30 is facilitated in both the fine pore area 21*a* and the coarse pore area 21*b* without delay.

Meanwhile, the dispositions of the fine pore area 21*a* and the coarse pore area 21*b* are variably realized without limitation to certain patterns, so long as product water and reactive gas can be separately transferred through selective transfer channels by alternately forming the fine pore area 21*a* and the coarse pore area 21*b*. For example, as shown in FIG. 2, the fine pore area 21*a* and the coarse pore area 21*b* may be alternately and repeatedly formed in a length direction (x-axis direction). As a result, reactive gas incorporated in an inlet manifold of the separator 30 moves in an outlet manifold direction (length direction; x-axis direction) and then moves through the fine pore areas 21*a* alternately contacting based on the length direction (x-axis direction) toward the membrane electrode assembly 10, while product water generated in the membrane electrode assembly 10 moves through the coarse pore area 21*b* in the direction of the separator 30 and is then discharged from the inlet manifold of the separator 30 to the outlet manifold direction (length direction; x-axis direction).

In addition, as shown in FIG. 3, the fine pore area 21*a* and the coarse pore area 21*b* may be alternately formed based on the width direction (z-axis direction).

As a result, as shown in FIG. 4, reactive gas incorporated in the inlet manifold of the separator 30 moves in the outlet manifold direction (length direction; x-axis direction) and then moves through the fine pore areas 21*a* alternately contacting based on the width direction (z-axis direction) toward the membrane electrode assembly 10, while water produced in the membrane electrode assembly 10 moves through the coarse pore area 21*b* in the direction of the separator 30 and is then discharged from the inlet manifold of the separator 30 along the outlet manifold direction (length direction; x-axis direction).

This is because, when pore sizes in the gas diffusion layer 20 are continuously and alternately controlled, the fine pore area 21*a* having a smaller pore size does not allow the product water to move easily, while the coarse pore area 21*b* having a larger pore size enables the product water to move easily, and as a result, water selectively moves through the coarse pore area 21*b* having a larger pore size, while reactive gas moves through the fine pore area 21*a* having a smaller pore size.

Meanwhile, the present invention is designed to impart different average pore sizes to areas while maintaining a similar proportion of pores to the proportion of pores formed in a conventional gas diffusion layer, wherein the proportion of the coarse pore area 21*b* is preferably greater than the proportion of the fine pore area 21*a*.

For example, a molar ratio of gas supplied to the air electrode 12 at RH of 50% is 0.18 for oxygen and is 0.12 for water vapor. In addition, the proportion of product water created by chemical reaction is 0.36. At this time, assuming that 100% of humidification gas supplied without considering the water saturation degree of the polymer electrolyte membrane 11 moves to the polymer electrolyte membrane 11 and product water created by chemical reaction entirely moves toward the separator 30, the ratio is preferably 1:1.2, when nitrogen not participating in the reaction is excluded.

Accordingly, the fine pore area 21*a* and the coarse pore area 21*b* are repeatedly disposed at a ratio of 40 to 50:50 to 60, preferably 45:55. The proportion of the coarse pore area 21*b* and the proportion of the fine pore area 21*a* can be varied depending on operation conditions of the fuel cell.

Next, a method of manufacturing the gas diffusion layer for fuel cells having the configuration described above will be described.

First, a device for manufacturing the gas diffusion layer for fuel cells according to the present invention will be described.

Figure 5:
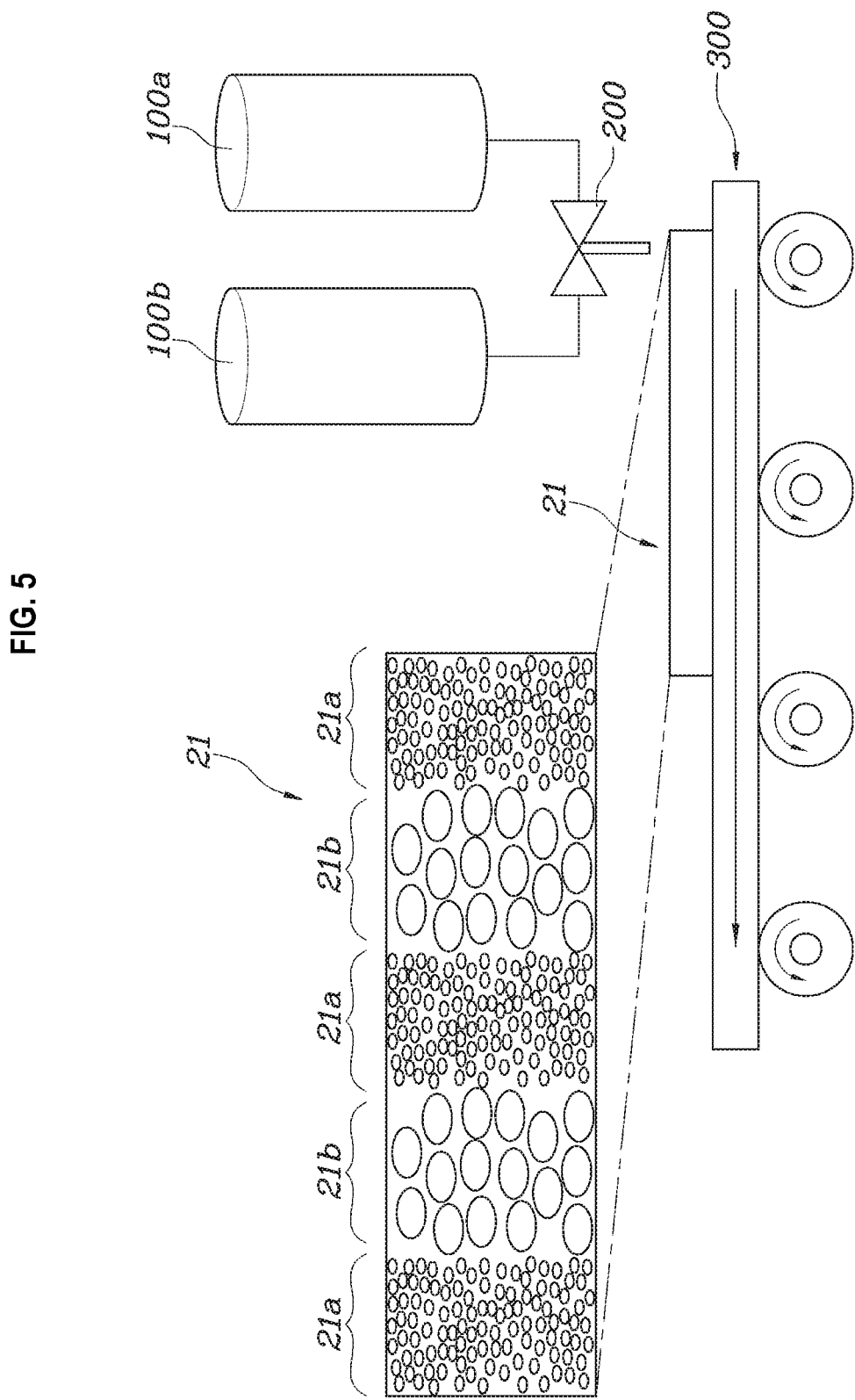
FIG. 5 shows a configuration of a device for manufacturing the gas diffusion layer for fuel cells according to the present invention.

FIG. 5 shows a configuration of the device for manufacturing the gas diffusion layer for fuel cells according to the present invention.

As shown in FIG. 5, in order to manufacture the carbon fiber support 21 of the gas diffusion layer 20, a first tank 100*a* for storing carbon fibers to form the fine pore area 21*a* and a second tank 100*b* for storing carbon fibers to form the coarse pore area 21*b* are prepared. In addition, at least one valve 200, which is connected to the first tank 100*a* and the second tank 100*b* to selectively discharge the carbon fibers stored in the first tank 100*a* and the second tank 100*b*, is provided and a conveyer 300 to deliver the formed gas diffusion layer 20 in an x-axis direction is prepared under the valve 200.

Carbon fibers for fine pores to form the fine pore area 21*a* where fine pores are formed are prepared in the first tank 100*a*, while carbon fibers for coarse pores to form the coarse pore area 21*b* where coarse pores are formed are prepared in the second tank 100*b*.

At this time, the carbon fibers for fine pores are only a short fiber type of first carbon fibers, while the carbon fibers for coarse pores are only a long fiber type of second carbon fibers. Preferably, the first carbon fibers have a length of about 6 mm, while the second carbon fibers have a length of about 12 mm. Both the carbon fibers for fine pores and the carbon fiber for coarse pores can be realized by a combination of a short fiber type of first carbon fibers and a long fiber type of second carbon fibers. In this case, the proportion of the first carbon fibers mixed to prepare the carbon fibers for fine pores is preferably maintained to be higher than the proportion of the first carbon fibers mixed to prepare the carbon fibers for coarse pores.

In addition, the carbon fibers for fine pores may be obtained by preparing a short fiber type of first carbon fibers and a long fiber type of second carbon fibers, while the carbon fibers for coarse pores may be obtained by preparing a long fiber type of second carbon fibers alone.

When carbon fibers are prepared in the first tank 100*a* and the second tank 100*b*, the carbon fibers each prepared in the first tank 100*a* and the second tank 100*b* are dispersed by the conveyer while selectively opening the valve 200, to form a carbon fiber support 21.

For example, in order to form the carbon fiber support 21 shown in FIG. 2, carbon fibers for fine pores prepared in the first tank 100*a* are first dispersed in the conveyer 300 moving in the x-axis direction and the carbon fibers for coarse pores prepared in the second tank 100*b* are then dispersed therein. By alternately dispersing the carbon fibers for fine pores and the carbon fibers for coarse pores based on the x-axis direction, as described above, the carbon fiber support 21 including the fine pore area 21*a* and the coarse pore area 21*b* alternately formed in the length direction can be produced.

At this time, a carbon fiber support 21 having a predetermined average pore size in a thickness direction (y-axis direction) can be produced by alternately dispersing the carbon fibers for fine pores and the carbon fibers for coarse pores on the same plane.

Meanwhile, in order to form the gas diffusion layer 20 shown in FIG. 3, one valve 200 connected to the first tank 100a in the z-axis direction and another valve 200 connected to the second tank 100b are alternately disposed on the conveyer 300 moving in the x-axis direction, and carbon fibers for fine pores and carbon fibers for coarse pores are alternately disposed based on the z-axis direction by simultaneously opening one valve 200 connected to the first tank 100a and other valve 200 connected to the second tank 100b while operating the conveyer 300, to produce a carbon fiber support 21 including the fine pore area 21a and the coarse pore area 21b alternately formed in the width direction.

At this time, a carbon fiber support 21 having a predetermined average pore size in the thickness direction (y-axis direction) can be produced by alternately dispersing the carbon fibers for fine pores and the carbon fibers for coarse pores on the same plane.

When the carbon fiber support 21 is prepared as described above, the prepared carbon fiber support 21 is cut and a fine pore layer 22 is then formed on one or two surfaces of the carbon fiber support 21.

For example, the fine pore layer 22 is formed by preparing a mixture of a carbon powder such as acetylene black carbon or Black Pearls carbon, and a polytetrafluoroethylene (PTFE)-based hydrophobic agent and applying the mixture to one surface of the carbon fiber support 21.

As apparent from the foregoing, advantageously, the embodiments of the present invention can selectively allow reactive gas and product water to be transferred through a fine pore area and a coarse pore area, respectively, and can thus facilitate transfer of both the reactive gas and the product water by alternately forming the fine pore area and the coarse pore area that have a predetermined average pore size in a thickness direction of a gas diffusion layer, but have different average pore sizes in a length or width direction of the gas diffusion layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a fuel cell comprising a gas diffusion layer, the method comprising:
   preparing carbon fibers for fine pores to form fine pores;
   preparing carbon fibers for coarse pores to form coarse pores;
   alternately dispersing the carbon fibers for fine pores and the carbon fibers for coarse pores on the same plane to form a carbon fiber support; and
   forming a fine porous layer over and contacting a first major outer surface of the carbon fiber support, the gas diffusion layer comprising the fine porous layer and the carbon fiber support;
   providing the carbon fiber support disposed between the fine porous layer and a separator;
   providing the fine porous layer between an membrane electrode assembly and the carbon fiber support; and
   having a second major outer surface of the carbon fiber support contact the separator, the second major outer surface being opposite to the first major outer surface.

2. The method according to claim 1, wherein preparing the carbon fibers for fine pores is carried out using a short fiber type of first carbon fibers; and
   wherein preparing the carbon fibers for coarse pores is carried out using a long fiber type of second carbon fibers.

3. The method according to claim 1, wherein preparing the carbon fibers for fine pores is carried out using a combination of a short fiber type of first carbon fibers and a long fiber type of second carbon fibers;
   wherein preparing the carbon fibers for coarse pores is carried out using a combination of a short fiber type of first carbon fibers and a long fiber type of second carbon fibers; and
   wherein a proportion of the first carbon fibers mixed for the preparation of the carbon fibers for fine pores is higher than a proportion of the first carbon fibers mixed for the preparation of the carbon fibers for coarse pores.

4. The method according to claim 1, wherein the carbon fiber support is formed by alternately dispersing the carbon fibers for fine pores and the carbon fibers for coarse pores in a length direction.

5. The method according to claim 1, wherein the carbon fiber support is formed by alternately dispersing the carbon fibers for fine pores and the carbon fibers for coarse pores in a width direction.

6. The method according to claim 1, further comprising forming a fine pore layer on a surface of the carbon fiber support, after forming the carbon fiber support.

7. A gas diffusion layer for fuel cells, the gas diffusion layer comprising:
   a carbon fiber support; and
   a fine porous layer disposed over and contacting a first major outer surface of the carbon fiber support and to be interposed between a membrane electrode assembly and a separator, the carbon fiber support being disposed between the fine porous layer and the separator, a second major outer surface of the carbon fiber support contacting the separator, the second major outer surface being opposite to the first major outer surface;
   wherein the carbon fiber support comprises:
      a plurality of fine pore areas, each fine pore area having an average pore size in a thickness direction in the membrane electrode assembly; and
      a plurality of coarse pore areas, each coarse pore area having a larger predetermined average pore size than the average pore size of the fine pore area in the thickness direction in the membrane electrode assembly; and
   wherein the plurality of fine pore areas and the plurality of coarse pore areas are alternately formed such that two adjacent ones of the plurality of fine pore areas are separated from one another by one of the plurality of coarse pore areas.

8. The gas diffusion layer according to claim 7, wherein the plurality of fine pore areas and the plurality of coarse pore areas are alternately formed based on a length direction.

9. The gas diffusion layer according to claim 7, wherein the plurality of fine pore areas and the plurality of coarse pore areas are alternately formed based on a width direction.

10. The gas diffusion layer according to claim 7, wherein the average pore size of each of the plurality of fine pore areas is less than 40 µm and the average pore size of each of the plurality of coarse pore areas is greater than 40 µm.

11. The gas diffusion layer according to claim 7, wherein a proportion of the plurality of coarse pore areas is greater than a proportion of the plurality of fine pore areas.

12. The gas diffusion layer according to claim 11, wherein the plurality of fine pore areas and the plurality of coarse pore areas are repeatedly disposed at a ratio of 40 to 50:50 to 60.

13. A fuel cell, comprising:
a membrane electrode assembly;
a separator;
a carbon fiber support; and
a fine porous layer disposed over and contacting a first major outer surface of the carbon fiber support and interposed between the membrane electrode assembly and the separator, the carbon fiber support being disposed between the fine porous layer and the separator, a second major outer surface of the carbon fiber support contacting the separator, the second major outer surface being opposite to the first major outer surface;
wherein the carbon fiber support comprises:
a plurality of fine pore areas, each fine pore area having an average pore size in a thickness direction in the membrane electrode assembly; and
a plurality of coarse pore areas, each coarse pore area having a larger predetermined average pore size than the average pore size of the fine pore area in the thickness direction in the membrane electrode assembly; and
wherein the plurality of fine pore areas and the plurality of coarse pore areas are alternately formed such that two adjacent ones of the plurality of fine pore areas are separated from one another by one of the plurality of coarse pore areas.

14. The fuel cell according to claim 13, wherein the plurality of fine pore areas and the plurality of coarse pore areas are alternately formed based on a length direction.

15. The fuel cell according to claim 13, wherein the plurality of fine pore areas and the plurality of coarse pore areas are alternately formed based on a width direction.

16. The fuel cell according to claim 13, wherein the average pore size of each of the plurality of fine pore areas is less than 40 μm and the average pore size of each of the plurality of coarse pore areas is greater than 40 μm.

17. The fuel cell according to claim 13, wherein a proportion of the plurality of coarse pore areas is greater than a proportion of the plurality of fine pore areas.

18. The fuel cell according to claim 17, wherein the plurality of fine pore areas and the plurality of coarse pore areas are repeatedly disposed at a ratio of 40 to 50:50 to 60.

* * * * *